Oct. 18, 1955     L. D. HUDDLESTON ET AL     2,720,797
V-BELT DRIVE DIFFERENTIAL GEAR MECHANISMS
Filed Feb. 19, 1954     2 Sheets-Sheet 1

INVENTORS
Leo Delmar Huddleston
Helen Letha Huddleston,

Oct. 18, 1955
L. D. HUDDLESTON ET AL
2,720,797
V-BELT DRIVE DIFFERENTIAL GEAR MECHANISMS
Filed Feb. 19, 1954
2 Sheets-Sheet 2
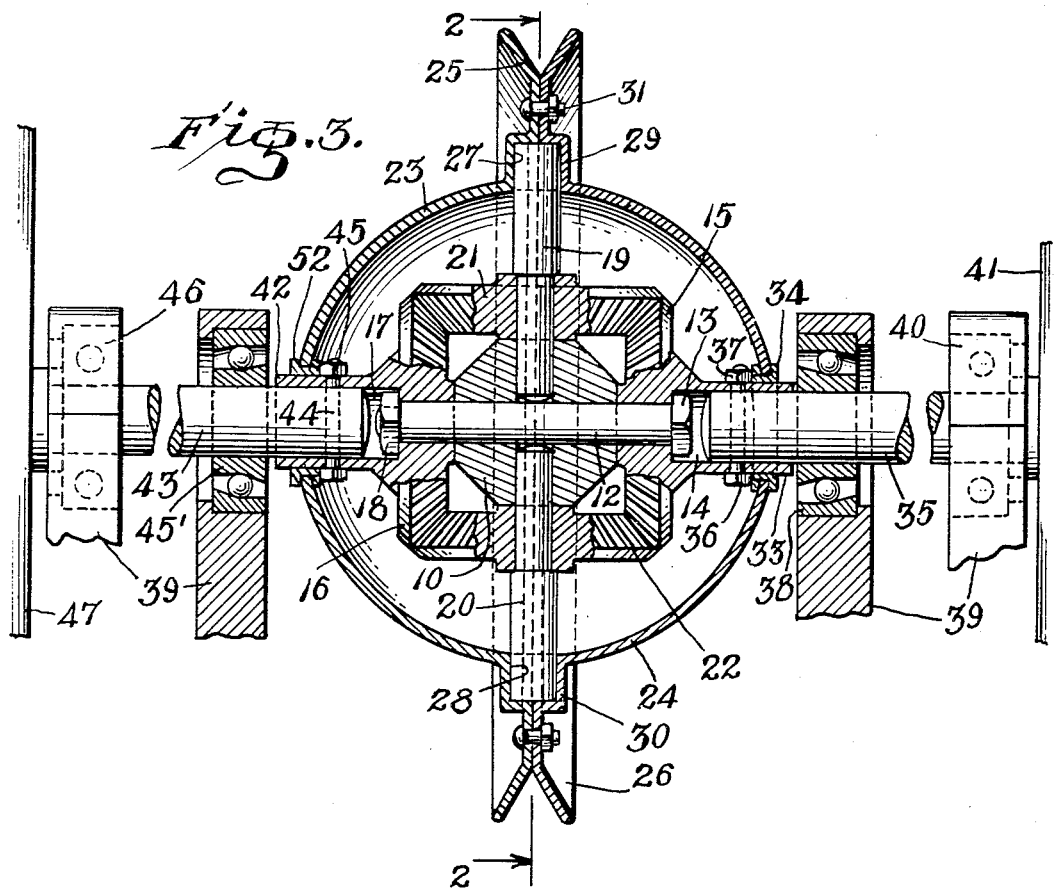
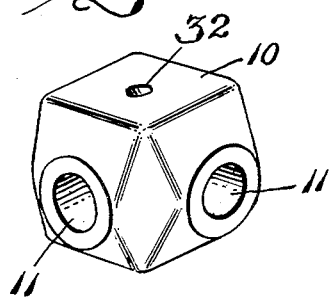
INVENTORS
Leo Delmar Huddleston
Helen Letha Huddleston, United States Patent Office 2,720,797
Patented Oct. 18, 1955

2,720,797

V-BELT DRIVE DIFFERENTIAL GEAR MECHANISMS

Leo Delmar Huddleston and Helen Letha Huddleston, Picher, Okla.

Application February 19, 1954, Serial No. 411,343

1 Claim. (Cl. 74—713)

This invention relates to a V-belt differential gear mechanism.

It is an object of the present invention to provide a lightweight V-belt differential drive gear mechanism adapted for use with lightweight vehicles which has a gear casing surrounding the differential gears to which the V-pulley is attached for the rotation and driving of the mechanism which serves as the casing to enclose the gears and from the opposite sides of which there are extended the drive shafts connected to the drive wheels.

Other objects of the invention are to provide a lightweight differential drive gear mechanism for lightweight vehicles which is of simple construction, inexpensive to manufacture, has a minimum number of parts, easy to assemble, durable, has long life, rugged, compact and consumes little space, effective and efficient in operation.

For a better understanding of the invention, reference may be had to the following detailed description taken in connection with the accompanying drawing, in which:

Fig. 3 is a vertical sectional view taken generally on line 3—3 of Fig. 1;

Fig. 4 is a perspective view of the center supporting block.

Figure 1:
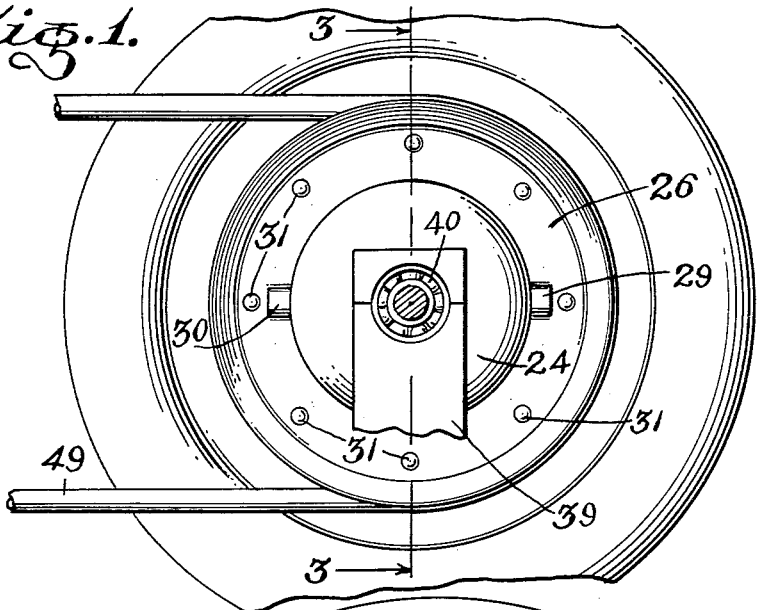
Figure 1 is a side elevational view of the differential gear mechanism embodying the features of the present invention.
Figure 2:
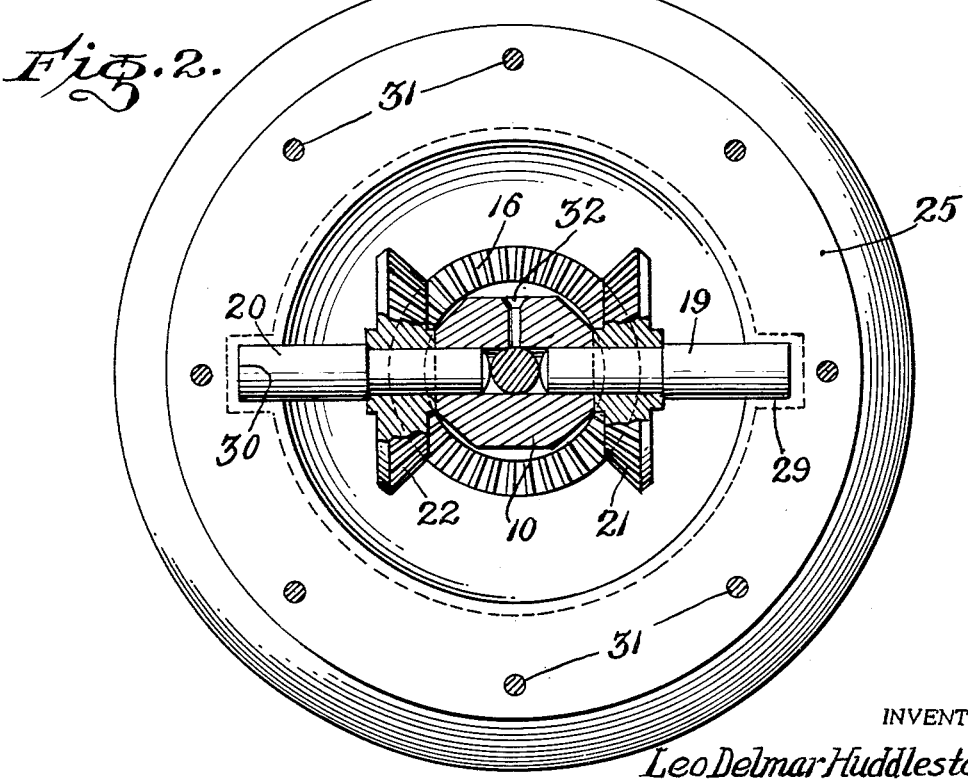
Fig. 2 is a vertical sectional view taken generally on line 2—2 of Fig. 3 and looking upon one face of the split pulley.

Referring now to the figures, 10 represents a center supporting block having four sides with shaft openings 11 in the respective sides. Extending through to the openings diametrically opposite and from one side to the other is a bolt 12 having a head 13 lying in an opening 14 in the shank of a bevel bear 15. This bolt 12 extends into a bevel gear 16 at the opposite side of the block which has an opening 17 in its shank and in which is disposed a securing nut 18 fixed to the bolt to hold the differential gears against the block 10 and for rotation upon the bolt 12.

In the other openings of the block and at the opposite sides thereof there is fitted respective pins 19 and 20. These pins respectively rotatably carry bevel gears 21 and 22 which are rotatable upon the pins and which mesh with the bevel gears 15 and 16 to effect a driving action therebetween.

The pins respectively project outwardly from the bevel gears and their ends are made secure by combined split casing and pulley members 23 and 24 which respectively have split V portions 25 and 26. These V portions are respectively relieved or recessed as indicated at 27 and 28 and at 29 as well as at 30 to receive, when the members 23 and 24 are joined together and made secure by rivets 31 extending through the portions 24 and 26, the ends of the pins 19 and 20. This fixes the block 10 in a central position within the casing members 23 and 24 and makes for a rigid construction; and by these pins 19 and 20 the bevel gears 21 and 22 are held against the block 10 in proper spaced relationship. The pins 19 and 20 are respectively shouldered so as to engage the outer faces of the gears 21, 22 and retain them in place upon the block.

The block 10 has a countersunk opening 32 adapted to receive lubricating oil for the lubrication of the bolt 12 and the pins 19 and 20 within the block openings 11.

The bevel gear 15 has its shank, as indicated at 33, extending through a bushing 34 in the casing member 24. A drive shaft 35 extends into the opening 14 and is secured thereto by a bolt 36 extending transversely through the shaft 35 and through the shank portion 33 and made secure by a nut 37. The shaft 35 is mounted in a ball bearing unit 38 that is supported in a frame 39. The shaft may also be journalled in a ball bearing unit 40 adjacent to wheel 41.

The gear 16 has a shank portion 42 having the opening 17. Into this opening there is extended a drive shaft 43 that is fixed by a bolt 44 and nut 45 to the shank portion 42 of the gear 16. This drive shaft 43 extends through ball bearing units 45′ and 46 mounted in the frame 39. A wheel 47 is fixed to the outer end of the shaft 43.

In use, the differential gear mechanism is driven by a V-belt 49 extending over the V-pulley of the casing parts and is driven by a drive pulley formed on the vehicle that can be either motor operated or manually driven.

It will be apparent that there has been provided a differential gear wherein the pulley part is a part of the casing and can be driven and which serves to enclose the differential bevel gears. The casing will be driven about the drive wheel shafts 35 and 43 on bushings 34 and 52 and the bevel gears 21 and 22 will rotate and move the bevel gears 15 and 16 containing the drive shafts 35 and 43. Differential action will be obtained upon the vehicle being turned to place greater drive on one wheel than on the other.

It will be further apparent that there has been provided a differential gear mechanism which is of simple construction, easy to assemble, light in weight and which employs a minimum number of parts.

While various changes may be made in the detail construction, it shall be understood that such changes shall be within the spirit and scope of the present invention as defined by the appended claim.

We claim:

A differential drive gear mechanism comprising a pin block, said pin block having openings lying in a common plane and angularly spaced from one another, bevel gears disposed on opposite sides of the pin block, a bolt extending through the bevel gears and the pin block openings securing said gears upon said pin block for rotation with respect thereto and upon said bolt, a nut securing said bolt in place upon the gears and pin block, drive shafts respectively connected to the respective bevel gears, other drive gears disposed at opposite sides of the pin block, pivot pins secured in the openings of the pin block and respectively retaining said other drive gears for rotation thereupon, said other drive gears being in mesh with the first mentioned drive gears, said pivot pins respectively having extensions, a two-part drive casing journalled upon the first mentioned gears, said casing having recesses for receiving respectively the extensions of said pivot pins, each of said casing parts having a V pulley formation concentric with the casing part and upon the parts being joined with one another serving to provide a V pulley formation adapted to receive a V belt, whereby upon said casing being driven by a V belt, differential action is effected between the gears and the drive shafts.

(References on following page)

References Cited in the file of this patent

UNITED STATES PATENTS

| | | |
|---|---|---|
| 872,269 | Williams | Nov. 26, 1907 |
| 1,158,439 | Bonting | Nov. 2, 1915 |
| 1,315,217 | Eason | Sept. 9, 1919 |
| 1,428,346 | Strong | Sept. 5, 1922 |
| 1,657,374 | Dietzel | Jan. 24, 1928 |
| 1,660,113 | Bjur | Feb. 21, 1928 |
| 2,408,926 | Griffith | Oct. 8, 1946 |
| 2,548,258 | Griffith | Apr. 10, 1951 |
| 2,646,689 | Maher | July 28, 1953 |
| 2,680,972 | Tone | June 15, 1954 |